United States Patent [19]

Kelley

[11] 4,374,738

[45] Feb. 22, 1983

[54] DRILLING FLUID COMPOSITION

[75] Inventor: Jack R. Kelley, Whatcom County, Wash.

[73] Assignee: Georgia-Pacific Corporation, Atlanta, Ga.

[21] Appl. No.: 303,946

[22] Filed: Sep. 21, 1981

Related U.S. Application Data

[63] Continuation of Ser. No. 157,876, Jun. 9, 1980, abandoned.

[51] Int. Cl.$^3$ .............................................. C09K 7/02
[52] U.S. Cl. ............................ 252/8.5 C; 252/8.5 A; 524/445
[58] Field of Search ........................ 252/8.5 A, 8.5 C; 260/17.5

[56] References Cited

U.S. PATENT DOCUMENTS

| | | | |
|---|---|---|---|
| 2,552,775 | 3/1951 | Fischer et al. | 252/8.5 |
| 2,702,788 | 2/1965 | Dawson | 252/8.5 |
| 2,816,100 | 12/1957 | Walker . | |
| 2,911,365 | 11/1959 | Burland et al. | 252/8.5 |
| 2,935,473 | 5/1960 | King et al. | 252/8.5 |
| 3,484,397 | 12/1969 | Szalay et al. . | |
| 3,640,826 | 2/1972 | Lang et al. | 252/8.5 |
| 3,764,530 | 10/1973 | Burland et al. . | |
| 3,985,659 | 10/1976 | Felicetta et al. | 252/8.5 |
| 4,276,077 | 6/1981 | Zaslavsky et al. . | |

FOREIGN PATENT DOCUMENTS

| | | |
|---|---|---|
| 2329082 | 1/1975 | Fed. Rep. of Germany . |
| 2657433 | 10/1977 | Fed. Rep. of Germany . |
| 1534099 | 11/1978 | United Kingdom . |

OTHER PUBLICATIONS

Rosenberg et al., Proceeding of the Institute of Higher Learning, Chemistry and Chemical Technology, 16(1), 1973, pp. 112–117.
Nam et al., *J. Polymer Sci.*, 9, 1971, pp. 855–866.
Nam et al., Cellulose Chemistry and Technology, 8, 1974, pp. 263–281.
Rosenberg et al., Proceedings of the Institute of Higher Education, Chemistry and Chemical Tech., 18(2), 1975, pp. 293–296.
Chernyavskaya et al., Wood Chemistry, 1, 1978, pp. 96–99.
Berlin, Proceedings of the Institute of Higher Learning, Chemistry and Chemical Technology, 23(7), 1980, pp. 880–895.
Berlin et al., Russian Author's Certificate, 444,772, 1974.
Berlin et al., Chemistry of Wood (Riga) 1, 1977, pp. 70–73.
Kuryatnikov et al., J. Ins. of Higher Learning, Chem. and Chem. Tech., 18(6), 1975, pp. 944–947.
Kuryatnikov et al., J. Ins. of Higher Learning, Chem. and Chem. Tech., 19(3), 1976, pp. 498–499.

*Primary Examiner*—Herbert B. Guynn
*Attorney, Agent, or Firm*—Schuyler, Banner, Birch, McKie & Beckett

[57] ABSTRACT

A water-based drilling fluid composition is described which comprises an aqueous dispersion of a clay material containing an effective dispersing amount of a modified lignosulfonate which is obtained by graft polymerization of from 5 to 30 weight percent of an acrylic compound with the lignosulfonate. The grafted lignosulfonate has an average molecular weight of less than 80,000.

19 Claims, No Drawings

DRILLING FLUID COMPOSITION

This is a continuation of application Ser. No. 157,876, filed June 9, 1980, now abandoned.

This invention pertains to a drilling fluid composition. More particularly, it pertains to a drilling fluid composition comprising a graft copolymer of lignosulfonate and an acrylic compound such as to render the copolymer especially useful in drilling fluids.

Water-based drilling fluids have been widely used to drill subterranean wells such as oil and gas wells. These drilling fluids are often referred to as "drilling muds" because they comprise an aqueous dispersion of clay material. Such dispersions are thixotropic and it was found that certain lignosulfonates improved the properties thereof and such lignosulfonates came to be called "thinners" since, among other things, they function to reduce the effective viscosity of the drilling fluid under drilling conditions. The history and function of such drilling fluids is described in more detail in U.S. Pat. No. 2,935,473. This patent discloses and claims a major innovation in lignosulfonate thinners, namely the use of certain metal salts of lignosulfonate wherein the metals are chromium, aluminum, iron, copper, or a combination thereof, which salts may or may not be oxidized. Of the metal lignosulfonate salts disclosed in the above patent, the chromium salt has been most effective so that the chromium salt or salts of chromium mixed with other metals have been in the past mainly used. In addition to better thinning properties of the chromium salt, the thermal stability of drilling fluids containing the chromium salt is considerably improved over drilling fluids containing lignosulfonates of other metals. Recently, however, the use of chromium is being discouraged in view of the unknown environmental and pollution effects. Also, the availability of oil and gas at readily accessible locations has diminished and it has become necessary to drill wells to deeper levels. As the drilling depth increases, the temperature to which the drilling fluids are subjected increases so that thermal stability of the drilling fluid is becoming a more important consideration.

Polyacrylates, such as acrylic telomers are disclosed in U.S. Pat. No. 2,911,365 as being effective as a dispersant in muds. These polymers are prepared in the presence of a halogenated alkane, such as a halomethane, which enters into the polymer. Also, U.S. Pat. No. 2,552,775 discloses the use of a polyacrylic acid having a molecular weight in the range of from 5,000 to 50,000 in drilling fluids. The use of low-molecular weight acrylic acid polymers, having a molecular weight of less than 2,500 is disclosed in U.S. Pat. No. 3,764,530. In the latter patent, it is disclosed that the low-molecular weight acrylic acid polymers are thermally stable and may be used in high-temperature drilling fluids. It also discloses that the low-molecular weight acrylic acid homopolymer may likewise be mixed with chrome lignosulfonate-containing muds to reduce the thermal degradation of the drilling fluid and enhance the effectiveness of the mixture in high-temperature muds. While the polyacrylic acid drilling fluids may have enhanced thermal stability, generally the acrylic acid or acrylate drilling fluids are not as effective as desired in the presence of contamination or in treated muds such as salt water or gyp muds.

High molecular weight acrylic polymers are also used in low solids drilling fluids or muds where the polymer functions to increase the yield of the clays and also as a flocculant for cuttings and low-yield clays. The use of a mixture of polyacrylate and acrylate-acrylamide polymers having molecular weights in the range of 2 to 20 million is disclosed in U.S. Pat. No. 3,558,545. A high molecular weight graft copolymer of lignosulfonate and polyacrylate having an intrinsic viscosity of at least 1 dlg$^{-1}$ in 0.1 M sodium chloride aqueous solution at 25° C. with an acrylic compound is disclosed in U.S. Pat. No. 3,985,659 for use in low solids muds.

It is, therefore, an object of the present invention to provide a chrome-free drilling fluid composition. Another object is to provide a modified lignosulfonate drilling fluid additive free of heavy metals which may be used in many respects as a replacement of the presently used chromium lignosulfonate-containing drilling fluid compositions. A further object is to provide a drilling fluid composition having an enhanced thermal stability and which may be effectively used in drilling wells at temperatures above 250° F. Another object is to provide an improved drilling fluid additive.

The above and other objects are obtained by this invention which comprises using an effective dispersing amount of a reaction product of lignosulfonate and an acrylic compound, such as acrylic acid, acrylonitrile, acrylamide, and other acrylic acid derivatives such as esters of alcohols of one or two carbon atoms and acrylic acid in an aqueous drilling fluid composition containing clay material. The grafted product of lignosulfonate and the acrylic compound is prepared by reacting lignosulfonate with from 5 to 30 percent of the acrylic compound using a free radical initiator to obtain a reaction product having an average molecular weight not exceeding about 80,000. The drilling fluid composition has good thermal stability generally exceeding the present day chromium-containing drilling fluid additives in most mud systems except in gypsum-containing and some other muds where a small addition of a phosphate or polyphosphate and other additives such as particular heavy metal cations may be added to enhance the effectiveness of acrylic acid grafted lignosulfonate products, as disclosed in patent application Ser. No. 158,243 filed on June 10, 1980 by co-worker Kenneth A. E. Blackmore.

The reaction or polymerization of the acrylic compound with the lignosulfonate is effected using conventional grafting techniques of polymerizing vinyl monomers to polymers with free radical type reactions. The reaction is preferably carried out by reaction of the acrylic compound with the lignosulfonate in an aqueous medium. In carrying out the reaction with free radical generation, an association of the acrylic compound with the lignosulfonate is obtained characteristic of graft type copolymers. Preferably, free radical initiators such as benzoyl peroxide, alpha-azobisisobutyronitrile, cumene hydroperoxide, and other free radical initiators, such as hydrogen peroxide-metal redox system, may be used. With the latter initiators, generally lignosulfonate as obtained contains sufficient amount of iron so that additions of metal do not have to be made.

Lignosulfonates obtained from any source may be used for the polymerization with the acrylic compound. Lignins are polymeric substances composed of substituted aromatics found in plant and vegetable tissue associated with cellulose and other plant constituents. In the pulp and paper industry, lignin-containing materials such as wood, straw, corn stalks, bagasse, and other vegetable and plant tissues are processed to recover the cellulose or pulp. The residual pulping liquors containing the lignin as by-products are, thus, one of the main sources of lignins. While there is some variation in the chemical structure of lignin, depending upon the plant from which lignin is obtained, place where the plant is grown, and also upon the method used in recovery or isolation of the lignin from the plant tissue, the basic structure and properties of the lignins are similar, all containing an aromatic nucleus through which the reaction may possibly be affected. Thus, lignins obtained by any method or from any source may be used in this reaction as long as the lignin is in a form which may at least be partially soluble in a solvent in which it may be grafted with the acrylic compound to form the product of this invention.

Since the lignins separated from the plant may be chemically altered somewhat from that found in the plant, the term "lignins", as used herein, means the lignin products which are obtained upon separation from the cellulose or recovered from the plant. In the sulfite pulping process, the lignocellulosic material is digested with a sulfurous acid-metal bisulfite solution resulting in the sulfonation of the lignins. In other methods of the recovery or separation of the lignins from the plant, the lignins may not be sulfonated but may be chemically altered somewhat in some other manner. For example, in residual pulping liquors obtained in the sulfate and other alkaline pulping processes, the lignins are present as alkaline metal salts dissolved in the alkaline aqueous liquor. "Hydrolysis lignin" is obtained from the hydrolysis of lignocellulosic materials found in the plant. The lignin obtained by hydrolysis or by an alkaline pulping process may be sulfonated as well as spent sulfite liquor being further sulfonated. Also, the lignin products such as a residual pulping liquor may be subjected to various treatments such as, for example, acid, alkaline or heat treatment or reacted with other chemicals which may further alter somewhat the lignin constituents. The lignins remain operative as long as the treatment is not so severe as to destroy the basic aromatic polymeric structure.

The residual pulping liquors, or the lignin-containing product obtained in the separation or recovery of lignins from the plant, will generally contain lignins of various molecular weights varying from less than 1,000 to 100,000. A weight average molecular weight of these lignins is generally in the range of 10,000 to 15,000. These liquors also may contain other constituents besides the lignins. For example, in the sulfite pulping process, the spent sulfite liquor contains lignosulfonates which may be present as salts of cations, such as magnesium, calcium, ammonium, sodium and other cations which may have been present during the sulfonation of the lignin. The spent sulfite liquor generally contains only about 40 to 60 weight percent on an oven-dried basis of lignosulfonates with the remainder being carbohydrates and other organic and inorganic constituents dissolved in the liquor. Lignin products obtained by other pulping processes may likewise contain other materials such as carbohydrates, degradation products of carbohydrates, and resinous materials which are separated from the lignocellulosic materials with the lignin. Lignin obtained by hydrolysis of lignocellulosic materials may not contain the carbohydrates but may contain resinous-type materials as well as other materials which are not removed by the hydrolysis. It is not necessary to separate the lignin-containing constituents from the other constituents. The lignin product as obtained containing all of the constituents may be used as such or subjected to different treatments such as alkaline, acid, or heat treatments as well as reacted with chemicals to modify or remove some of the non-lignin constituents prior to the polymerization reaction. Some reaction of the acrylic compound with the non-lignin constituents may be obtained, but the presence of the products of reaction of these constituents is not of sufficient importance to warrant their removal before or after the polymerization. They are generally of lower molecular weight materials and can be easily removed from the final lignosulfonate-acrylic graft copolymer after reaction if desired using methods, such as dialysis, gel permeation chromatography, chemical precipitation and extraction, or other methods wwell known in the art for the fractionation and recovery of high molecular weight organic water-soluble polymers from lower molecular weight materials. The lignin materials may also be separated from the non-lignin constituents and fractionated into fractions of various molecular weights prior to reaction with the acrylate monomer.

The acrylic compound which is preferably used for the preparation of the lignosulfonate graft polymer is acrylic acid. Derivatives of acrylic acid such as acrylonitrile and acrylamide may also be used by themselves or in mixtures with acrylic acid. Drilling fluids prepared with the lignosulfonate-acrylic compound products have improved thermal stabilities over chromium lignosulfonates but are not effective in muds such as gypsum-containing muds without the addition of phosphate. When a mixture of acrylic acid and another acrylic compound is used in preparation of the graft copolymer, the amount of the acrylic acid employed in the mixture generally is from about 10 to 90%, preferably 60 to 40%, but may be widely varied as long as the mixture, when grafted upon the lignosulfonate, is water soluble or upon alkaline hydrolysis becomes water soluble.

While the reaction of the lignin with the acrylic compound using free radical initiators is preferably carried out in an aqueous medium, other solvents such as alkanols having from 1 to 4 carbon atoms, acetone, dioxane, ethylene glycol, formamide, dimethylformamide, dimethylsulfoxide, and others may be used. Preferably the solvents which are water miscible and which can be used in mixture with water are preferred. In some of the reactions, the presence of an alcohol, such as methanol, may enhance the reaction of the acrylic compound with the lignin molecule. However, it is not necessary to use an aqueous medium. The copolymerization of the lignosulfonate with the acrylic compound may be carried out in other media in which the reactants are at least partially soluble. For example, the medium used may be such that the lignin is only partially soluble, swelling in the medium, or a medium in which the lignosulfonate-acrylic copolymer will precipitate upon formation. The products obtained may vary somewhat depending upon the particular reaction employed for the polymerization of the lignin with the acrylic compound. For example, the number and molecular weight of the acrylic side chains grafted to the lignosulfonate backbone presumably may differ when the reaction is carried out using a peroxide or chemical free radical initiator in place of irradiation as well as when particular acrylic compounds are used.

The lignosulfonate is copolymerized with from 5 to 30 weight percent of the acrylic compound, preferably with from 10 to about 20 percent. The amount of initiator used is generally such that when the reaction is relatively completed the average molecular weight of the lignosulfonate graft polymer with the acrylic compound will not exceed about 80,000. With the higher amounts of acrylic compounds, for example, the amount of initiator used may have to be more closely controlled to complete the graft polymerization without obtaining excessive cross-linking between the lignosulfonate units to give a product of excess molecular weight. At the desired molecular weights, the copolymer is generally readily water soluble and, thus, may be used as the drilling fluid additive. Preferably a copolymer having an average molecular weight in the range of 20,000 to 60,000 is preferred. The graft polymerization is generally carried out under acid conditions using a pH below 6, preferably at a pH between 3 to 4. The amount of acrylic compound used may be varied depending upon the properties desired in the final product. For drilling fluids which may be subjected to normal temperatures, from 5 to 10 percent of acrylic acid will result in an effective thinner. Usually from 10 to 15 percent of the acrylic compound is used for the polymerization. The product thus obtained generally gives good thermal stability which will exceed that of a chrome lignosulfonate. It is about as effective as a thinner as a chrome lignosulfonate in seawater muds and in gyp muds with the addition of other additives. With higher amounts of the acrylic compound copolymerized with lignosulfonates, generally further improvements in thermal stability are obtained, e.g., at drilling temperatures approaching 475° F., 20% and greater of the acrylic compound would be used which would give a thinner which is considerably more effective for high-temperature muds than the presently used chrome lignosulfonate. For these high temperatures, generally the alkali metal salts, preferably sodium or potassium salts, of the copolymer are used. The presence of heavy metal cations, such as iron for example, has a negative effect on thermal stability, so if the heavy metal is used for the high temperatures it is usually used in limited amounts only.

In determining the molecular weight of the graft copolymer of lignosulfonate and the acrylic compound, the agar gel diffusion method, as described by J. Moacanin, H. Nelson, E. Back, V. F. Felicetta and J. L. McCarthy in the Journal of the American Chemical Society 81, 2054 (1959), is used.

In preparation of the drilling fluid composition, the methods and procedures conventionally used for preparation of these compositions with other additives are normally followed. The copolymer is added in a sufficient amount to effectively disperse the clay and other constituents in the drilling fluid and can be widely varied, similar to the variations presently employed with the chrome-containing drilling fluid additives, depending upon the formations being drilled and the depth of the well. The additives may be used with weighting materials, water loss agents and also with other additives such as, for example, phosphate or polyphosphate in particular contaminated muds.

The following examples further illustrate the invention.

EXAMPLE I

A number of runs were made where a fermented calcium-based spent sulfite liquor was reacted in the presence of hydrogen peroxide with acrylic acid, acrylonitrile, and a mixture of the two. The products obtained were then used as drilling mud additives and tested for thermal stability.

The lignosulfonate used was a calcium-based fermented spent sulfite liquor which had been diluted to about 42% solids concentration. To the spent sulfite liquor containing 100 grams solids, 10 grams of acrylic acid were intermixed with the spent sulfite liquor solution and then 5 grams of hydrogen peroxide were slowly added as a 35% aqueous solution. The mixture was then heated for 3 to 4 hours on a hot water bath at a temperature in the range of 70° to 75° C. with occasional stirring. After the reaction, the sample was cooled, centrifuged or filtered and freeze dried.

In a process similar to that described above, other samples were prepared where, instead of acrylic acid, the spent sulfite liquor containing 100 grams solids was reacted with 10 grams of acrylonitrile and with a mixture of 5 grams each of acrylonitrile and acrylic acid.

The freeze dried products were then used as drilling fluid additives and tested for thermal stability at 425° F.

The following procedure was used for the thermal stability test for this and the following Examples. The sample in a specific amount was mixed into a fresh water mud and the mixture hot rolled at 150° F. for 20 hours at a pH of about 9.5. After the hot rolling, the sample was cooled and barium sulfate as a weighing agent was added in an amount to give a density of 16 pounds per gallon. The mixture was then mixed and hot rolled again for an additional 20 hours at 150° F. at a pH of about 9.5. After the second hot rolling, the sample was placed in a sealed metal container and heated at 425° F. for 22 hours. After heating, the sample was cooled and a shear test and mud tests similar to API standard test procedures for drilling fluids were made.

The results obtained are shown in Table I below compared to a control which was a commercial ferrochrome lignosulfonate drilling fluid additive sold under the trademark of Q-BROXIN.

TABLE I

| Acrylic Graft Compound | % Acrylic Compound | Thermal Stability Test at 425° F. at 15#/bbl | | | | | | | |
|---|---|---|---|---|---|---|---|---|---|
| | | Shear | PH | IG | 600 | 300 | PV | Y | 10G |
| Acrylic Acid | 10% | 323 | 8.0 | 1.0 | 46.5 | 23.5 | 23.0 | 0.5 | 12 |
| Acrylonitrile | 10% | 800 | 8.2 | 4.0 | 63.5 | 36.5 | 27.0 | 9.5 | 82 |
| Acrylic Acid | 5% | 592 | 8.2 | 2.5 | 58.0 | 32.0 | 26.0 | 6.0 | 56 |
| Acrylonitrile | 5% | | | | | | | | |
| Control | | 1083 | 8.0 | 5.0 | 130.0 | 73.5 | 56.5 | 17.0 | 75 |

EXAMPLE II

A fermented calcium-based liquor was base exchanged to the sodium base by addition of sodium sulfate to precipitate the calcium as calcium sulfate which was then removed by filtration. To 3,666 grams of the base-exchanged liquor having a solids concentration of 44.9% were added 164.6 grams of acrylic acid which was about 10% of the spent sulfite liquor solids. To this mixture, 58.8 grams of 35% hydrogen peroxide were then added which represented about 1.25 weight percent of the spent sulfite liquor solids. The liquor as obtained contained about 80–100 ppm of iron so that no additional iron was added. The mixture was heated for approximately 3 to 4 hours on a hot water bath at a temperature in the range of 70° to 80° C. After the reaction 164.6 grams of sodium hexametaphosphate dissolved in water were added to the product. After mixing, the product was at a pH of 3.9. The sample was spray dried and tested for thermal stability at 425° F. at 15 pounds per barrel of additive and in gypsum and seawater containing muds. The results obtained as compared to a control are shown below. The control was a commercial ferrochrome lignosulfonate described in Example I.

TABLE II

| Additive | Type of Mud | Amount of Additive | Shear | PH | IG | 600 | 300 | PV | Y | 10G |
|---|---|---|---|---|---|---|---|---|---|---|
| lignosulfonate-Acrylic Acid | Seawater | 3#/bbl | — | 8.3 | 8.0 | 37.5 | 28.0 | 9.5 | 18.5 | 38.0 |
| Control | " | 3#/bbl | — | 8.4 | 6.0 | 28.5 | 19.0 | 9.5 | 9.5 | 18.0 |
| Lignosulfonate-Acrylic Acid | Gypsum | 6#/bbl | — | 8.3 | 1.0 | 34.5 | 19.0 | 15.5 | 3.5 | 3.0 |
| Control | " | 6#/bbl | — | 8.2 | 1.0 | 28.5 | 16.0 | 12.5 | 3.5 | 8.0 |
| Thermal Stability Test at 425° F. | | | | | | | | | | |
| Lignosulfonate-Acrylic Acid | | 15#/bbl | 387 | 8.5 | 3.5 | 112.5 | 66.0 | 46.5 | 19.5 | 6.0 |
| Control | | 15#/bbl | 2150 | too thick to test | | | | | | |

EXAMPLE III

A sodium-based spent sulfite liquor prepared as described in Example II was reacted with 15, 20 and 25% of acrylic acid. In the first run made, the sodium lignosulfonate solution in an amount of 221 grams containing 45.2% solids was diluted with 50 grams of water and then 15 grams of acrylic acid were added. After addition of the acrylic acid, 3.6 grams of 35% hydrogen peroxide were added and the sample was heated for about 3 to 4 hours on a hot water bath at 70° to 80° C. The pH of the reaction mixture was 3.8.

Similar to the procedure described above, two additional runs were made where 20 grams and 25 grams, respectively, of acrylic acid were used instead of the 15 grams above. The samples after preparation were cooled and a portion of each of the samples was freeze dried and tested in an amount of 3 pounds per barrel as additives for seawater drilling fluid and for thermal stability at 425° F. at 15 pounds per barrel of additive. The results obtained are shown in the Table below. A commercial ferrochrome lignosulfonate as noted above was used as the control for the seawater drilling fluid.

TABLE III

| Run | Amount of Acrylic Acid Reacted, % | Shear | PH | IG | 600 | 300 | PV | Y | 10G |
|---|---|---|---|---|---|---|---|---|---|
| Seawater Drilling Fluid at 3#/bbl of Additives | | | | | | | | | |
| 1 | 15 | — | 8.0 | 15.0 | 39.5 | 29.5 | 10.0 | 19.5 | 43.0 |
| 2 | 20 | — | 8.0 | 7.5 | 36.5 | 26.5 | 10.0 | 16.5 | 38.0 |
| 3 | 25 | — | 8.2 | 11.0 | 32.0 | 23.0 | 9.0 | 14.0 | 37.0 |
| Control | — | — | 8.2 | 6.0 | 31.0 | 21.0 | 10.0 | 11.0 | 18.0 |
| Thermal Stability Test at 425° F. at 15#/bbl | | | | | | | | | |
| 1 | 15 | 353 | 7.3 | 4.0 | 130.0 | 78.0 | 52.0 | 26.0 | 19.0 |
| 2 | 20 | 198 | 7.8 | 3.5 | 119.0 | 72.0 | 47.0 | 25.0 | 12.0 |
| 3 | 25 | 148 | 7.8 | 3.5 | 113.0 | 67.5 | 45.5 | 22.0 | 7.5 |

What is claimed is:

1. A water-base drilling fluid comprising a suspension of clay material and an effective dispersing amount of a water-soluble graft copolymer which is the reaction product of lignosulfonate and an acrylic compound selected from the group consisting of acrylic acid, acrylonitrile, acrylamide, and esters of alcohols of one or two carbon atoms and acrylic acid, said reaction product being prepared by reacting lignosulfonate with from 5 to 30 weight percent said acrylic compound at a pH below 6 using a free radical initiator, said reaction product having an average molecular weight not exceeding about 80,000.

2. A composition according to claim 1 wherein the water-base drilling fluid is a seawater drilling fluid.

3. A composition of claim 1 wherein the acrylic compound is acrylamide.

4. A process according to claim 1 wherein the acrylic compound is acrylonitrile.

5. A composition according to claim 1 wherein the acrylic compound is acrylic acid.

6. A composition according to claim 5 wherein the acrylic acid is reacted with the lignosulfonate in an amount of from 10 to 15 percent.

7. A composition according to claim 1 wherein the lignosulfonate is reacted with the acrylic compound until said reaction product has an average molecular weight in the range of 20,000 to 60,000.

8. A composition according to claim 7 wherein the acrylic compound is acrylonitrile.

9. A composition according to claim 7 wherein the acrylic compound is acrylamide.

10. A composition according to claim 7 wherein the acrylic compound is acrylic acid.

11. A composition according to claim 10 wherein the water-base drilling fluid is a seawater drilling fluid.

12. A composition according to claim 10 wherein the reaction product is essentially an alkali metal salt.

13. A composition according to claim 12 wherein the reaction product is essentially a sodium salt.

14. A composition according to claim 12 wherein the reaction product is essentially a potassium salt.

15. A process of drilling a well comprising circulating in the well, while drilling, a drilling fluid composition of claim 1.

16. A process of drilling a well comprising circulating in the well, while drilling, a drilling fluid composition of claim 5.

17. A process of drilling a well comprising circulating in the well, while drilling, a drilling fluid composition of claim 6.

18. A process of drilling a well comprising circulating in the well, while drilling, at a temperature above 250° F., a drilling fluid composition of claim 1.

19. A process of drilling a well comprising circulating in the well, while drilling, at a temperature above 250° F., a drilling fluid composition of claim 12.

* * * * *